(12) United States Patent
Foerster et al.

(10) Patent No.: US 10,659,399 B2
(45) Date of Patent: May 19, 2020

(54) MESSAGE ANALYSIS USING A MACHINE LEARNING MODEL

(71) Applicant: Google LLC, Mountain View, CA (US)

(72) Inventors: Jakob Nicolaus Foerster, Oxford (GB); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 124 days.

(21) Appl. No.: 15/853,189

(22) Filed: Dec. 22, 2017

(65) Prior Publication Data

US 2019/0199656 A1   Jun. 27, 2019

(51) Int. Cl.
*H04L 12/28* (2006.01)
*H04L 12/58* (2006.01)
(Continued)

(52) U.S. Cl.
CPC .......... *H04L 51/02* (2013.01); *G06F 17/2705* (2013.01); *G06F 17/276* (2013.01);
(Continued)

(58) Field of Classification Search
CPC ....... H04L 51/02; H04L 51/063; H04L 51/04; H04L 51/16; G06N 20/00; G06F 17/2705; G06F 17/276
(Continued)

(56) References Cited

U.S. PATENT DOCUMENTS 5,428,784 A * 6/1995 Cahill, Jr. ............ G06Q 10/107
708/112

5,528,745 A * 6/1996 King ..................... G06F 3/0481
715/753

(Continued)

FOREIGN PATENT DOCUMENTS

EP         2393046 A1    12/2011

OTHER PUBLICATIONS

Bell, "email can use Google's AI to write replies for you", May 17, 2017. Mashable. Retrieved from the Internet: <http://mashable.com/2017/05/17/gmail-smart-replies/#5Xpn25v8Y0qK> 6 pp.

(Continued)

*Primary Examiner* — Glenford J Madamba
(74) *Attorney, Agent, or Firm* — Shumaker & Sieffert, P.A.

(57) ABSTRACT

A method includes receiving a received message and a draft reply message to the received message, the received message including a received message component, the received message component representing one or more of a question, a request, and a subject. The method also includes parsing the received message to detect the received message component and parsing the draft reply message into one or more reply message components, identifying, using one or more machine learning models, informational components associated with the received message component and the one or more reply message components by at least applying the machine learning module to the received message component and each reply message component of the one or more reply message, and identifying, based on the one or more informational components, one or more deficient components in the subject draft reply message, and outputting, for display, information about the one or more deficient components.

20 Claims, 5 Drawing Sheets

(51) Int. Cl.
*G06F 17/27* (2006.01)
*G06N 20/00* (2019.01)
*G06Q 10/10* (2012.01)

(52) U.S. Cl.
CPC ........... *G06N 20/00* (2019.01); *G06Q 10/107* (2013.01); *H04L 51/063* (2013.01); *H04L 51/04* (2013.01); *H04L 51/16* (2013.01)

(58) Field of Classification Search
USPC ........................................................ 709/206
See application file for complete search history.

(56) References Cited

U.S. PATENT DOCUMENTS

| | | | |
|---|---|---|---|
| 6,816,885 B1 * | 11/2004 | Raghunandan | H04L 51/12 709/206 |
| 7,209,951 B2 * | 4/2007 | Goldberg | G06Q 10/107 707/999.009 |
| 7,580,719 B2 | 8/2009 | Karmarkar | |
| 7,660,855 B2 * | 2/2010 | Arning | G06F 17/276 704/10 |
| 8,306,511 B2 | 11/2012 | Ling et al. | |
| 8,385,975 B2 | 2/2013 | Forutanpour et al. | |
| 8,423,577 B1 | 4/2013 | Lee et al. | |
| 8,554,281 B2 * | 10/2013 | Scott | G06F 17/289 370/259 |
| 8,996,639 B1 * | 3/2015 | Faaborg | H04L 51/02 455/412.1 |
| 9,294,890 B1 * | 3/2016 | Boutcher | H04W 4/14 |
| 9,736,268 B1 * | 8/2017 | Tsay | H04L 67/327 |
| 10,250,541 B2 | 4/2019 | Beach et al. | |
| 2002/0059164 A1 * | 5/2002 | Shtivelman | H04L 12/1831 |
| 2005/0108345 A1 * | 5/2005 | Suzuki | H04L 51/00 709/206 |
| 2005/0135681 A1 * | 6/2005 | Schirmer | G06Q 10/107 382/229 |
| 2006/0075035 A1 * | 4/2006 | Tripp | G06Q 10/107 709/206 |
| 2006/0190830 A1 * | 8/2006 | Gerstl | G06Q 10/107 715/757 |
| 2006/0265453 A1 * | 11/2006 | Kaminsky | G06Q 10/107 709/206 |
| 2009/0254624 A1 * | 10/2009 | Baudin | G06Q 10/107 709/206 |
| 2009/0282114 A1 * | 11/2009 | Feng | G06Q 10/107 709/206 |
| 2012/0245944 A1 | 9/2012 | Gruber et al. | |
| 2013/0346347 A1 | 12/2013 | Patterson et al. | |
| 2014/0052680 A1 | 2/2014 | Nitz et al. | |
| 2014/0088954 A1 | 3/2014 | Shirzadi et al. | |
| 2014/0161356 A1 * | 6/2014 | Tesch | H04L 51/063 382/196 |
| 2015/0033143 A1 * | 1/2015 | Lee | H04L 51/16 715/752 |
| 2015/0089007 A1 * | 3/2015 | Amoroso | G06Q 10/107 709/206 |
| 2015/0302301 A1 | 10/2015 | Petersen | |
| 2015/0373201 A1 * | 12/2015 | Landers | H04L 12/1827 455/556.2 |
| 2017/0222961 A1 * | 8/2017 | Beach | H04L 51/16 |
| 2018/0089588 A1 | 3/2018 | Ravi et al. | |
| 2019/0199656 A1 | 6/2019 | Foerster et al. | |
| 2019/0199668 A1 | 6/2019 | Beach et al. | |

OTHER PUBLICATIONS

Hedge et al., "Efficient Machine Learning Using Random Projections," Department of Electrical and Computer Engineering, Rice University—Department of Electrical Engineering and Computer Science, The University of Michigan at Ann Arbor, Dec. 29, 2007, 2 pp.

Ravi et al., "Large Scale Distributed Semi-Supervised Learning Using Streaming Approximation," May 16, 2016, 10 pp.

* cited by examiner

MESSAGE ANALYSIS USING A MACHINE LEARNING MODEL

BACKGROUND

Some computing systems provide electronic messaging (e.g., e-mail) services that facilitate electronic communication between users of computing devices. During an e-mail exchange, participating users communicate back and forth with each other, sometimes responding to inquiries made by others in subsequent e-mail replies. Some e-mail systems may analyze draft replies prior to the sending of the draft reply. For example, a system analyzes a draft email for indications of potentially missing attachments. If the body of the draft email, for example, makes reference to an attachment, but the user has not yet attached any file to the draft email, the system may prompt the user with a warning indicating that the user may have forgotten to add an attachment.

SUMMARY

The disclosed subject matter relates to techniques for detecting missing information during electronic message exchanges between users, such as via email or instant messaging. Rather than determining whether the user has failed to attach a document, a message processing system evaluates draft messages for deficiencies in textual content of the message before the draft message is sent. For example, when composing an original email, or when composing a reply to an email from a friend or colleague ("sending party", e.g., another email user), it is not uncommon for users to draft emails that include incomplete information, or to forget to respond to a query that was provided in the initial email. As such, if sent as originally drafted, the deficient email tends to cause the recipient(s) to send subsequent communications to clarify the deficiency. A message processing system assists the drafter in these types of situations. The message processing system analyzes composed messages to detect textual content deficiencies. In one example, the message processing system integrates with an email client or an instant messaging client to analyze draft messages composed by the user.

For situations in which the user is responding to a received message, the message processing system analyzes the responsiveness of the draft reply message ("reply content") to aspects of the received message. The message processing system may analyze the received message to identify one or more seed subjects addressed in the received message. Such seed subjects may include questions posed to the user, information requested from the user, subjects addressed by the received message, etc. Responsive to identification of the seed subjects, the message processing system analyzes the draft reply message to detect any seed subjects from the received message that are not addressed in the draft reply message. For example, an incoming email may have asked where and when the user would like to meet for lunch, but a draft reply email may have only identified a proposed location and not a proposed time. The message processing system prompts the user as to what seed subjects appear to be unaddressed by the draft reply message prior to sending the reply message. In such situations, the received message may be used to determine what information may be expected by the recipient of the draft reply message (e.g., often the sender of the received message), and the draft reply message may be used to determine whether the user has fulfilled those expectations.

For situations in which the user is composing a message with "original content" (e.g., a message or message component that is not necessarily responsive to another message or seed subject), the message processing system identifies message components in the draft original message that are likely to cause a follow-up question, clarification, or the like. For example, the user may draft an original message indicating that they wish to meet the recipient for lunch at a particular location, but the user does not identify a date or time. Such a message might normally elicit a reply from the recipient requesting the missing information. The message processing system analyzes original messages for such message deficiencies and prompts the user as to what information is potentially missing prior to sending the draft original message. In such situations, the message processing system may use the draft original message to determine what information may be expected by the recipient of the draft original message, and to determine whether the draft original message includes sufficient information to fulfill those expectations.

By automatically detecting deficiencies in draft messages, the message processing system may cause a user to focus his or her attention on the deficiencies; thereby reducing the number of messages needed to be exchanged by users. Such automation may reduce network traffic through the messaging system, and promote more efficient user interactions with the example computing system, thereby causing the example computing system to receive fewer messages in general than other computing systems that do not identify message deficiencies in this way. The example message processing system may therefore perform fewer operations and may consume less electrical power and/or result in battery power savings, as compared to other computing systems. In addition, the example computing system may provide a less frustrating more enjoyable user experience.

In one example, the disclosure is directed to a method that includes receiving, by at least one processor, a subject received message and a subject draft reply message to the subject received message, the subject received message including a received message component, the received message component representing one or more of a question, a request, and a subject presented in the subject received message. The method also includes parsing, by the at least one processor, the subject received message to identify the received message component. The method further includes parsing, by the at least one processor, the subject draft reply message into one or more reply message components. The method further includes identifying, by the at least one processor, one or more informational components associated with the received message component and the one or more reply message components by at least applying one or more machine learning models to the received message component and each reply message component of the one or more reply message components. The method also includes identifying, by the at least one processor and based on the one or more informational components, one or more deficient components in the subject draft reply message. The method further includes outputting, for display, information about the one or more deficient components.

In another example, the disclosure is directed to a computing device that includes a storage device that stores one or more modules, and at least one processor that executes the one or more modules. The at least one processor receives a subject received message and a subject draft reply message to the subject received message, the subject received message including a received message component, the received message component representing one or more of a question, a request, and a subject presented in the subject received message. The at least one processor also parses the subject received message to detect the received message component. The at least one processor further parses the subject draft reply message into one or more reply message components. The at least one processor also identifies one or more informational components associated with the received message component and the one or more reply message components by at least applying one or more machine learning models to the received message component and each reply message component of the one or more reply message components. The at least one processor also identifies, based on the one or more informational components, one or more deficient components in the subject draft reply message. The at least one processor further outputs, for display, information about the one or more deficient components.

In another example, the disclosure is directed to a computer-readable storage medium comprising instructions that, when executed cause at least one processor of a computing system to receive a subject received message and a subject draft reply message to the subject received message, the subject received message including a received message component, the received message component representing one or more of a question, a request, and a subject presented in the subject received message. The computing system also parses the subject received message to detect the received message component. The computing system further parses the subject draft reply message into one or more reply message components. The computing system also identifies one or more informational components associated with the received message component and the one or more reply message components by at least applying one or more machine learning models to the received message component and each reply message component of the one or more reply message components. The computing system further identifies, based on the one or more informational components, one or more deficient components in the subject draft reply message. The computing system also outputs, for display, information about the one or more deficient components.

The details of one or more examples are set forth in the accompanying drawings and the description below. Other features, objects, and advantages of the disclosure will be apparent from the description and drawings, and from the claims.

DETAILED DESCRIPTION

Figure 1:
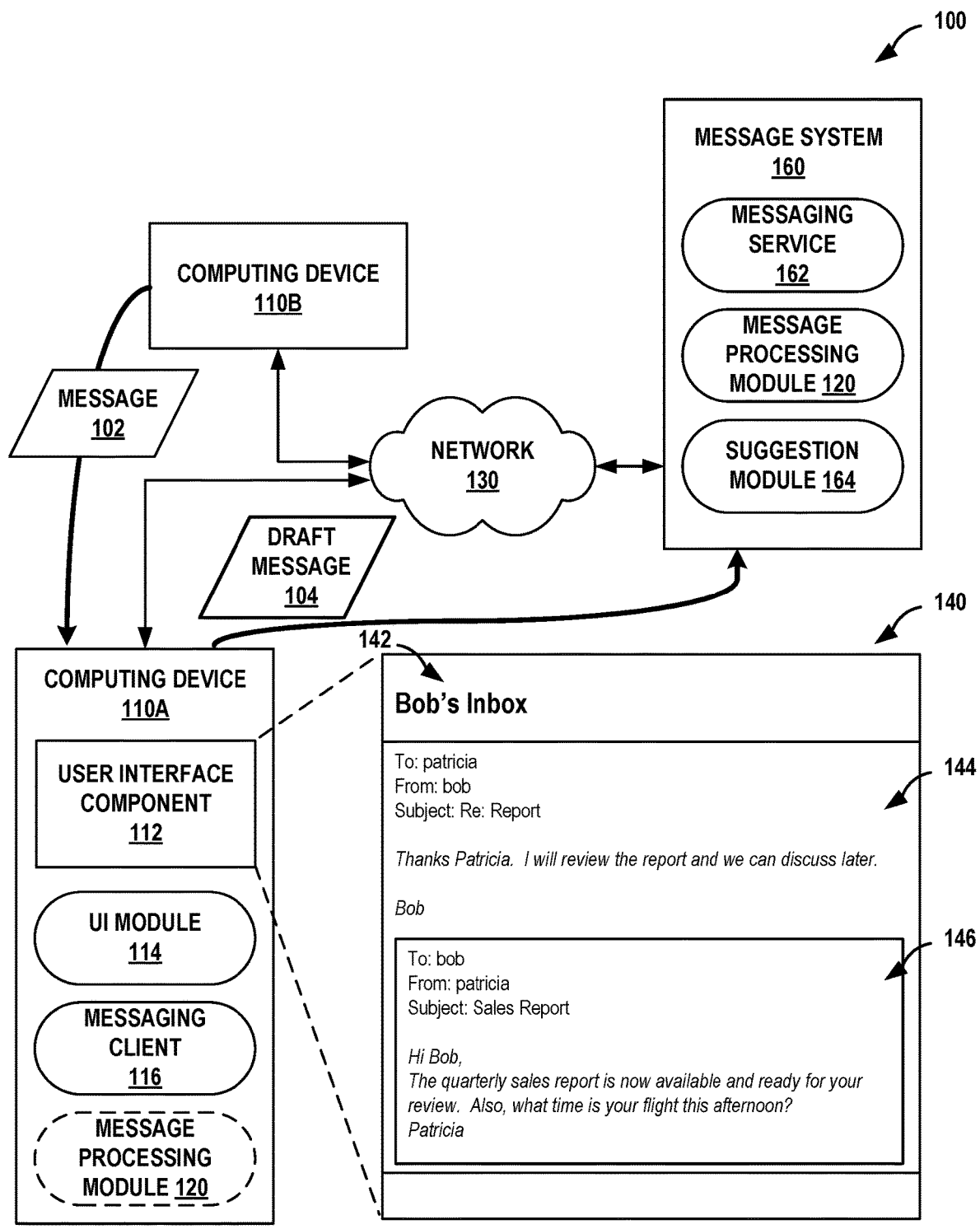
FIG. 1 is a conceptual diagram illustrating an example message processing system that executes an example message processing module, in accordance with one or more aspects of the present disclosure.

FIG. 1 is a conceptual diagram illustrating an example message processing system 100 that executes an example message processing module 120, in accordance with one or more aspects of the present disclosure. Message processing system 100 of FIG. 1 includes two computing devices 110A, 110B of users that are engaged in electronic messaging with each other via message system 160 on a network 130. In this example, a user of computing device 110A (the "drafting user") is composing draft message 104 that is responsive to message 102, such as an e-mail, sent from a sender (e.g., a user of computing device 110B). In other examples, draft message 104 may be a message with original content (e.g., a new e-mail or other message content that is not necessarily responsive to content in any other communication). Before the drafting user sends draft message 104 to its intended recipients, message processing system 100 analyzes draft message 104 for various types of deficiencies. For example, message processing system 100 may identify aspects of message 102 to which the drafting user did not respond in draft message 104, or message processing system 100 may identify aspects of draft message 104 that are incomplete, nebulous, or otherwise is likely to instigate a follow-up request from the recipient.

Network 130 represents any public or private communications network, for instance, cellular, Wi-Fi, and/or other types of networks, for transmitting data between computing systems, servers, and computing devices. Message system 160 may exchange data, via network 130, with computing device 110 to provide a messaging service that is accessible to computing devices 110 when computing devices 110 are connected to network 130. Network 130 may include one or more network hubs, network switches, network routers, or any other network equipment, that are operatively intercoupled thereby providing for the exchange of information between message system 160 and computing devices 110.

Computing devices 110 and message system 160 may transmit and receive data across network 130 using any suitable communication techniques. Computing devices 110 and message system 160 may each be operatively coupled to network 130 using respective network links. The links coupling computing devices 110 and message system 160 to network 130 may be Ethernet or other types of network connections and such connections may be wireless and/or wired connections.

Message system 160 represents any suitable remote computing system, such as one or more desktop computers, laptop computers, mainframes, servers, cloud computing systems, etc., that is configured to hosting an electronic messaging service. For example, message system 160 may be one or more mail servers configured to provide an e-mail messaging service, instant messaging service, or social media communications service. Each of computing devices 110 represent an individual mobile or non-mobile computing device that is configured to access the messaging service provided by message system 160. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to access an electronic messaging service.

Computing device 110A includes user interface component ("UIC") 112, user interface ("UI") module 114, messaging client module 116, and message processing module 120. In some examples, message system 160 may include message processing module 120. Modules 114, 116, and 120 may perform operations described herein using software, hardware, firmware, or a mixture of hardware, software, and firmware residing in and/or executing at computing devices 110. Computing devices 110 and message system 160 may execute modules 114, 116, and 120 with multiple processors or multiple devices, as virtual machines executing on underlying hardware, as one or more services of an operating system or computing platform, and/or as one or more executable programs at an application layer of a computing platform of computing devices 110 or message system 160.

UIC 112 of computing device 110 functions as an input and/or output device for computing device 110A. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user. As an input device, UIC 112 detects input (e.g., touch and non-touch input) from a user of computing device 110. Examples of user input gestures performed by a user (e.g., the user touching, pointing, and/or swiping at or near one or more locations of UIC 112 with a finger or a stylus pen). As an output device, UIC 112 presents information (e.g., audible, visual, and/or haptic information) to a user in the form of a user interface (e.g., user interface 140).

UI module 114 of computing device 110A controls UIC 112 including determining what UIC 112 presents and what information is exchanged between UIC 112 and other applications or components of computing device 110A. For example, in controlling what UIC 112 displays, UI module 114 may receive information from a component of computing device 110A, such as messaging client 116 or message processing module 120, for generating user interface 140 and elements thereof. In response, UI module 114 may output instructions and information to UIC 112 that cause UIC 112 to display user interface 140 according to the information received from messaging client 116. When handling input detected by UIC 112, UI module 114 may receive information from UIC 112 in response to inputs detected at locations of a screen of UIC 112 at which elements of user interface 140 are displayed. UI module 114 disseminates information about inputs detected by UIC 112 to other components of computing device 110A for interpreting the inputs and for causing computing device 110A to perform one or more functions in response to the inputs.

User interface 140 represents a graphical user interface from which a user of computing device 110A can interact with a messaging service accessed by computing device 110A, such as the messaging service provided by message system 160. User interface 140 includes a view of an inbox 142 of a messaging service mailbox. Within the inbox 142, user interface 140 includes graphical display of an electronic messages. In this example, the drafting user ("Bob") is composing draft message 104 while replying to message 102. The drafting user enters reply message text 144 into user interface 140 above received message text 146 from message 102 while composing draft message 104.

Messaging client 116 and messaging service module 162 communicate via network 130 to provide a messaging service to computing devices 110. Examples of a messaging service include: e-mail service, text messaging service, short message service, simple service messaging, multimedia message service, social media messaging service, voice message service, video message service, or any other service that facilitates the exchange of human-readable electronic messages. As used throughout the disclosure, the term "electronic message" is used to generally describe any type of human-readable electronic message that might be transmitted between computing devices. Examples of electronic messages include: instant messages, chat messages, electronic mail (e-mail) messages, social media communications, voicemail messages, video messages, or any other type of person-to-person communication that is accessed via a computing device.

Messaging client 116 provides the front-end, user facing features of the messaging service whereas messaging service module 162 supports the back-end operations used to implement the messaging service on network 130. Messaging client 116 is a portal from which computing devices 110 access electronic messages stored at message system 160 and/or at computing devices 110. Messaging client 116 may be an e-mail application, web application, or other module executing at computing devices 110 that communicates with message system 160 to provide users of computing devices 110 with access to messages maintained at message system 160 and/or computing devices 110.

Messaging service module 162 processes electronic messages received via network 130 from computing device 110 as well as other computing devices and messaging systems that are communicating via network 130. Messaging client 116 processes inbound electronic messages received via network 130 from message system 160 and sends, via network 130, outbound electronic messages to messaging service module 162 for further processing.

Messaging client 116 and messaging service module 162 maintain a messaging account associated with users of computing devices 110. That is, messages sent from or received by computing devices 110 may be stored in a sent box or an inbox of a messaging account associated with users of computing devices 110. The sent box and inbox may be maintained in memory of computing devices 110 and/or message system 160.

In a simple case when handling an inbound message (e.g., message 102) that is destined for computing device 110A, messaging service module 162 receives (e.g., via network 130) an electronic message for processing. Messaging service module 162 determines (e.g., from metadata of the electronic message) one or more recipients of the electronic message. If one of the recipients is a messaging account associated with the user of computing device 110A (e.g., the drafting user), messaging service module 162 may cause a copy of the electronic message to be stored in an inbox of the messaging account associated with the user of computing device 110A, whether that messaging account is stored locally at message system 160 or computing device 110A.

Likewise, when handling an outbound message that originated from computing device 110A (e.g., draft message 104), messaging service module 162 receives (e.g., via network 130) an electronic message for processing. Messaging service module 162 determines (e.g., from metadata of the electronic message) one or more recipients of the electronic message and sends the message to devices or message systems associated with the one or more recipients. Messaging service module 162 may cause a copy of the electronic message being sent to be stored as a sent item in the messaging account associated with the user of computing device 110A, whether that messaging account is stored locally at message system 160 or computing device 110A.

Message processing module 120 is configured to analyze draft message 104 for incomplete or ambiguous components prior to sending draft message 104 on to its intended recipients. Although shown as part of message system 160, in some examples, some or all of message processing module 120 executes as part of computing device 110A where message processing module 120 is configured to automatically analyze draft message 104 while being drafted within UIC 112. Said differently, some or all of the operations described herein which are attributed to message processing module 120 may be performed by message system 160 and/or computing device 110A (e.g., if computing device 110A is offline and disconnected from network 130).

With explicit permission to analyze personal information of a user of the messaging service provided by messaging service module 162 (e.g., inbound and outbound messages), message processing module 120 determines, in the case of a reply, whether draft message 104 addresses each seed subject present in a received email (e.g., message 102), or in the case of an original message, whether draft message 104 includes any subjects having ambiguous or incomplete information missing from draft message 104. For example, after the drafting user consents to message system 160 analyzing his or her electronic messages for potential content deficiencies, message processing module 120 may analyze message 102 to determine one or more seed subjects contained within the message, and may analyze draft message 104 (e.g., at the time the drafting user initiates sending the e-mail) to determine whether draft message 104 addresses each of the seed subjects identified from message 102.

Message processing module 120 may use a machine learning model trained with historical messages to identify deficient components of draft messages 104. In some examples, the machine learning model may be trained with received messages, draft messages, reply messages, and/or subsequent replies to determine when a particular draft reply does or does not address a seed subject, or when a draft message contains an ambiguity or missing component of information that is likely to lead to a subsequent email to clarify the ambiguity.

Various examples of reply messages or original messages exist. In the example email and reply illustrated in FIG. 1, the drafting user, "Bob," receives an email from another user, "Patricia," about a sales report. In her initial email, Patricia indicates that the quarterly sales report is ready for Bob's review (a first seed subject), and she asks what time Bob is scheduled to leave for the airport (a second seed subject) (as illustrated by received message text 146). However, when composing a reply, Bob mentions that he will review the report, but neglects to answer Patricia's question (as illustrated by reply message text 144). In response to detecting one or more seed subjects that are unaddressed by the draft reply, message processing module 120 may indicate to the drafting user that the content of the reply is deficient. In some examples, message processing module 120 may highlight a portion of the received message that appears to be unaddressed by the draft reply. Message processing module 120 may pre-populate the reply message with a template reply sentence, enabling the user to complete the template with information details, or may otherwise suggest an edit to satisfy the identified deficiency. For example, based on Patricia's unanswered question text "what time do you leave for the airport," message processing module 120 may add a template reply sentence of "I leave for the airport at _____" into the draft reply message.

In some cases, the drafting user may be composing a new draft message to a recipient, or the drafting user may be composing a reply message but including a new subject not included in the received message. For example, the drafting user may compose a new email to a colleague inviting him to lunch today at a local restaurant. Such an email is likely to elicit a reply email asking the time of the lunch because the drafting user neglected to mention a time in the initial email. As such, message processing module 120 analyzes the content of the draft message before sending the message to recipients, determines that the draft message includes a seed subject identifying a lunch event, determines that location and time are components included with such an event, and detects that while location is satisfied by existing content of the draft message, a time of the event is not included in the draft message. As such, message processing module 120 may query the inventor as to the missing information, or may suggest an edit, or may add a template sentence into the draft message, enabling the user to complete the template with additional information details that cure the deficiency.

For detecting deficient reply message content, a "comparison" model of message system 160, in some examples, is trained to automatically identify message components of a received message that are unaddressed by message components of an associated draft reply message. The comparison model's training comes from observations of past user behavior with regard to the messaging service provided by message system 160 and accessed by computing device 110. For instance, the comparison model may be a neural network, a long-short-term memory model, or other machine-learned model that is configured to determine from several signals associated with a message, whether replies to that message addressed the received message's components. The comparison model receives, as input, a received content element from an electronic message (e.g., a sentence or clause from text of the received message) and a reply content element (e.g., a sentence or clause from the draft reply message). The model produces, as output, an indication of a likelihood as to whether the reply content element addresses the received content element. To evaluate a given draft reply, message processing module 120 may parse the received message and the draft reply message into individual sentences or clauses and, for each component of the received message, may use the model against each of the reply message components of the draft reply message to determine whether that component of the received message has been addressed by at least one of the reply message components.

For detecting deficient original content, the model of message system 160, in some examples, may use the "comparison" model described above, and may also train an "informational components" model that, together, can be used to automatically identify message components of an original message that introduce an ambiguity or have missing information. The informational components model's training comes from observations of past user behavior with regard to the messaging service provided by message system 160 and accessed by computing device 110. For instance, the informational components model may be a neural network, a long-short-term memory model, or other machine-learned model that is configured to determine from several signals associated with a message, what informational components are associated with a particular seed subject.

The model receives, as input, a seed subject. The model produces, as output, one or more informational components associated with that seed subject. To evaluate a given original message for deficient content, message processing module 120 may identify parse the original message to detect one or more seed subjects. For each seed subject, message processing module 120 uses the informational components model to determine one or more informational components associated with that seed subject. Message processing module 120 uses the comparison model to determine, for each identified informational component, whether that informational component is already addressed by the contents of the original message. In other words, message processing module 120 uses the informational component as one input to the comparison model, and uses each sentence or clause of the original message as the other input to the comparison model, to determine whether that sentence or clause of the original message addresses the given informational component.

With explicit permission previously obtained from users to make use of and analyze their electronic messaging behavior, the training corpus of message behaviors used to train the comparison model of the informational component model may include historical message content from past messages and associated replies. Message system 160 and computing devices 110 further provide a way for users to withdraw consent to make use of and analyze their electronic messaging behavior and in response, message system 160 and computing device 110 stop analyzing the message behavior of those that withdraw consent.

In some examples, message processing module 120 may execute locally the user's device (e.g., computing device 110A), where the user composes draft message 104. As such, message processing module 120 may perform analysis of draft message 104 as the user composes the message, or message processing module 120 may perform analysis of draft message 104 when the user initiates sending of the draft message (e.g., by pressing a "send" button via UIC 112) or when the user initiates a check of the draft message (e.g., by pressing a "content check" button via UIC 112, or when performing a "spell check" feature of the draft message). Accordingly, draft message 104 is analyzed before draft message 104 is sent to message system 160.

In other examples, message processing module 120 may execute remotely on message system 160. As such, computing device 110A may transmit draft message 104 to message system 160 periodically as the user is drafting (e.g., to perform an interim, periodic check for deficiencies), or when the user manually initiates a check of draft message 104, or when the user attempts to send draft message 104. Responsive to receiving draft message 104 at message system 160, messaging processing module 120 analyzes draft message 104 for deficiencies and may transmit results of the analysis back to computing device 110A for presentation to the user. For examples in which the draft analysis is performed as a part of an attempt to send draft message 104 to recipients, message processing module 120 may cancel sending draft message 104 onto the recipients based on the results of the message analysis. For example, if draft message 104 is found to be deficient in some way, such as being non-responsive to one or more seed subjects of a received email, then message processing module 120 may terminate the sending of draft message 104, and may instead send an indication of the deficiencies found during the analysis back to computing device 110A for rectification by the user.

In some examples, message processing system 100 may utilize a suggestion module 164 to analyze draft messages. Suggestion module 164 is configured to predict likely replies or reply options given a component of message content. Message processing module 120 may parse the draft message into draft components, and may submit one or more of those draft components to suggestion module 164. Suggestion module 164 provides a set of likely replies based on the draft component, some of which may be in the form of a question. From this set of likely replies, message processing module 120 may identify one or more likely replies as indicating an ambiguity or information deficiency.

For example, if a particular likely reply is a question, then message processing module 120 may interpret that particular likely reply as an indication of an ambiguity in the associated draft component. As such, message processing module 120 may identify that particular draft component as a deficient component (e.g., highlighting that draft component in the draft message). Message processing module 120 may use the likely reply as a suggestion for remedying that deficient component. For example, message processing module 120 may display the question provided by the particular likely reply to the user, or may create a template reply to that question and insert the template reply into the draft message, or may submit the likely reply back into suggestion module 164 and use one of the likely replies to that particular likely reply as the template reply to insert into the draft message. As such, suggestion module 164 may be used as a component of message processing system 100.

In this way, an example computing system may improve efficiencies of a messaging service by reducing the volume of messages passed by the system. When the drafting user is informed of deficiencies in a reply message, the drafting user can avoid several unnecessary message transactions by properly drafting their messages. Upon being informed of a deficiency, such as a question or subject included in a received email but not yet addressed in the draft reply, or such as an ambiguity introduced by a statement made in original content, the drafting user can populate the draft message with the additional missing information.

By automatically detecting deficiencies in draft messages, an example computing system may cause a user to focus his or her attention on the deficiencies; thereby reducing the number of messages needed to be exchanged by users. Such automation may reduce network traffic through message processing system 100, and promote more efficient user interactions with the example computing system, thereby causing the example computing system to receive fewer messages in general than other computing systems that do not identify message deficiencies in this way. The example computing system may therefore perform fewer operations and may consume less electrical power and/or result in battery power savings, as compared to other computing systems. In addition, the example computing system may provide a less frustrating more enjoyable user experience.

Figure 2:
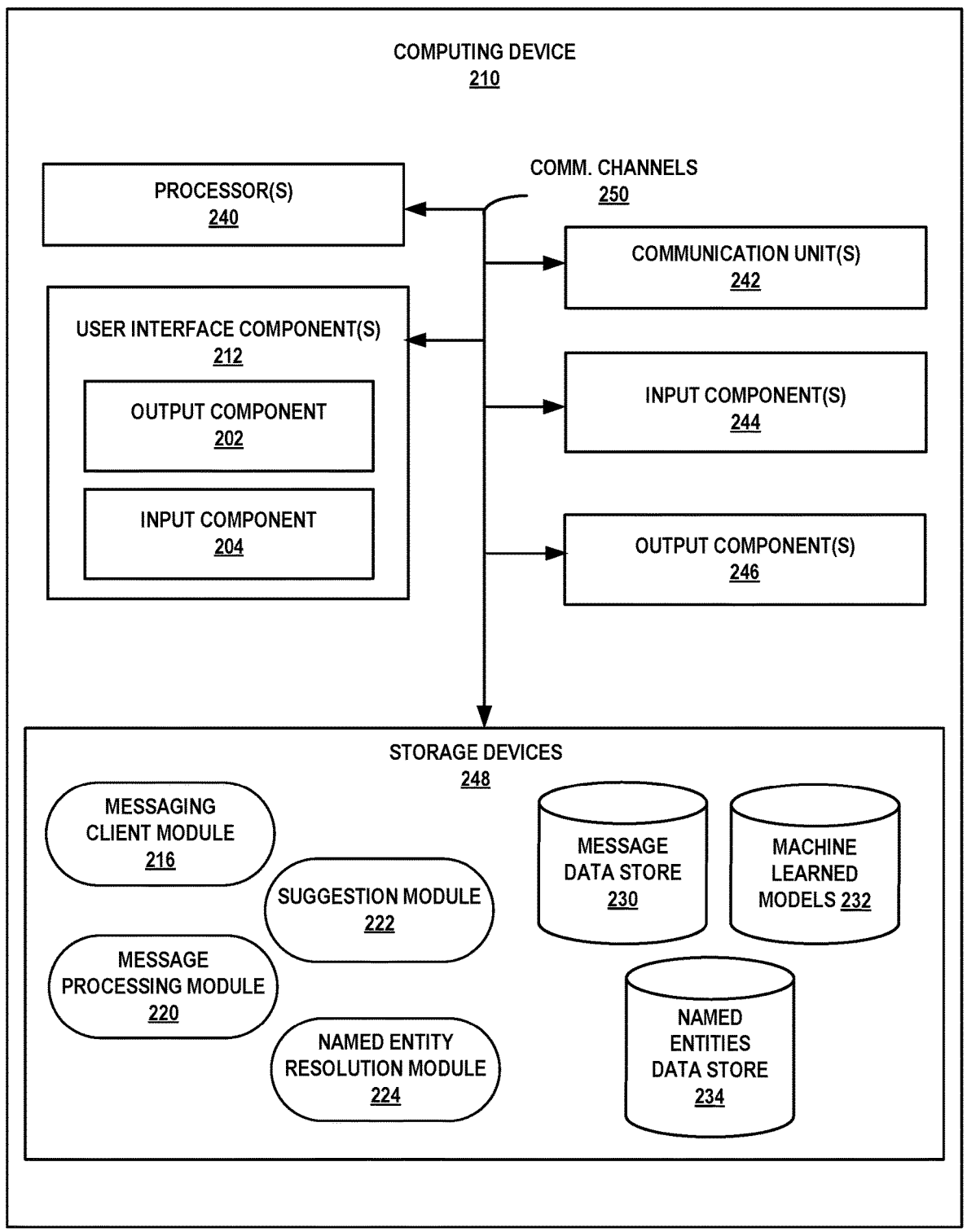
FIG. 2 is a block diagram illustrating an example computing device that is configured to analyze draft messages, in accordance with one or more aspects of the present disclosure.

FIG. 2 is a block diagram illustrating an example computing device that is configured to analyze draft messages, in accordance with one or more aspects of the present disclosure. Computing device 210 of FIG. 2 is described below within the context of message processing system 100 of FIG. 1 and as one example of computing device 110A of FIG. 1 (e.g., a user device in which message processing module 120 executes locally to perform aspects of message analysis as the user composes a draft message). In other examples, computing device 210 may represent a computing device that is a part of message system 160 (e.g., a server, a cloud service, etc., that communicates with the user's device while the user composes a draft message). FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 include messaging client module 216, message processing module 220, message data store 230, and machine learned models 232.

Communication channels 250 may interconnect each of the components 212, 240, 242, 244, 246, 248, and 252 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a global positioning satellite (GPS) receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD, etc.), mouse, keyboard, voice responsive system, video camera, microphone or any other type of device for detecting input from a human or machine.

One or more output components 246 of computing device 110 may generate output. Examples of output are tactile, audio, and video output. Output components 246 of computing device 210, in one example, includes a PSD, sound card, video graphics adapter card, speaker, liquid crystal display (LCD), organic light emitting diode (OLED) display, or any other type of device for generating output to a human or machine.

UIC 212 of computing device 210 may be similar to UIC 112 of computing device 110A and includes output component 202 and input component 204. Output component 202 may be a display component, such as a screen at which information is displayed by UIC 212 and input component 204 may be a presence-sensitive input component that detects an object at and/or near output component 202. Output component 202 and input component 204 may be a speaker and microphone pair or any other combination of one or more input and output components, such as input components 244 and output components 246. In the example of FIG. 2, UIC 212 may present a user interface.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc., that shares a wired and/or wireless data path with computing device 210).

One or more storage components 248 within computing device 210 may store information for processing during operation of computing device 210 (e.g., computing device 210 may store data accessed by modules 116, 220, message data store 230, and machine learned models 232 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 216, 220, message data store 230, and machine learned models 232. Storage components 248 may include a memory configured to store data or other information associated with modules 216, 220, message data store 230, and machine learned models 232.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Message processing module 220 may be operable by processors 240 to perform various actions, operations, or functions of computing device 210. For example, processors 240 of computing device 210 may retrieve and execute instructions stored by storage components 248 that cause processors 240 to perform the operations provided by message processing module 220. The instructions, when executed by processors 240, may cause computing device 210 to store information within storage components 248, for example, at message data store 230 and machine learned models 232.

UIC 212 may include all functionality of UIC 112 of FIG. 1 and may perform similar operations as UI component 112 for executing message processing module 220 as part of computing device 210. Messaging client module 216 and message processing module 220 may perform similar operations as messaging client module 116 and message processing module 120, respectively. Module 216, 220 may manage user interactions with UIC 212 and other components of computing device 210. Modules 216, 220 may cause UIC 212 to output a user interface as a user of computing device 210 views output and/or provides input at UIC 212.

Message data store 230 may include historical user messages (e.g., text content of past user messages) and message threads (e.g., content of multiple messages passed between users), along with associated metadata. Such historical message data may be used to train the various machine learning models 226 used by message processing module 220 to analyze draft messages.

Message processing module 220 may include all functionality of message processing module 120 of FIG. 1, and may perform similar operations as messaging client module 116, generally representing, for example, a messaging application and associated service used to compose and transmit messages between users of message processing system 100.

Message processing module 220 may be configured to analyze draft messages being composed by a user only after receiving explicit permission from the user. That is, a user may be provided with controls enabling the user to make an election as to both if and when messaging processing module 220 (as well as any other elements of computing device 210) may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

After receiving explicit permission from the user, in some examples, message processing module 220 is configured to analyze content of a draft message for responsiveness to a prior communication (e.g., while the user is drafting a reply to a previous email). When analyzing content of a draft message for responsiveness to a prior communication, the content of the draft message may be referred to herein as "responsive content," in the sense that the draft content is being examined in relation to whether or not that draft content is responsive to some component of content received in a prior message. For example, presume the drafting user received a message that included the question (e.g., as a "received component"): "What time do you leave for the airport?" When analyzing a draft message as to responsiveness to the received content, message processing module 220 may parse the draft message into draft components (e.g., sentences, sentence fragments, clauses, etc.), and may examine each of those draft components as to whether they are responsive to the particular received component.

In other examples, message processing module 220 is configured to analyze content of a draft message that is not necessarily responsive to a prior communication (e.g., while the user is drafting a new email, or while the user is drafting a reply that includes content regarding a new subject not included in the prior email). When analyzing content of a draft message for ambiguities or incompleteness that is not responsive content (e.g., statements which are likely to generate a responsive request for clarification or clarifying information), such content may be referred to herein as "original content," in the sense that the draft content is not being examined in relation to a prior communication, but is instead being examined in relation to the draft content itself.

For example, presume the drafting user drafts a new email to a friend that includes the message component: "Let's meet for lunch at 12:30." This message component mentions a time for lunch, but not a location. As such, the draft component is deficient in this respect. In some examples, message processing module 220 may analyze the draft message for missing information. For example, message processing module 220 may identify one or more suggested replies based on the message component. Suggested replies may be "Where should we go?", "Where to?", or "OK." Suggested replies that are in the form of a question may be used by message processing module 220 as an indication of an information deficiency (e.g., because the recipient is likely to ask a follow up question). In some examples, message processing module 220 may analyze the draft message for entity ambiguities. For example, presume a message component: "Let's meet for lunch, 12:30 at McDonalds." However, there are several McDonalds locations in the area and, as such, the recipient may not know which location the drafting user intends. Message processing module 220 may use named-entity resolution to identify the ambiguous entity (e.g., McDonalds) and may generate options for clarifying that ambiguity (e.g., a list of nearby locations from which to select).

In some examples, message processing module 220 utilizes a reply prediction system such as suggestion module 222 to analyze draft messages for deficiencies. Suggestion module 222 may be similar to suggestion module 164 of FIG. 1. Message processing module 120 may parse an input message or the draft message (e.g., into sentences, clauses, etc.) and submit each message component to suggestion module 222 to generate one or more suggested replies. Suggestion module 222 is configured to return one or more likely replies or reply options given a particular input message component. For example, given a message component such as "Are you coming?" may include suggested replies such as "I'll be right there," "yes," and "no." Suggestion module 222 may classify input messages and associated responses based on information types. For example, the message component "when works for you?" may be identified with an information type "TIME." As such, likely responses may include "let's go in 10 minutes," "now," "tomorrow."

Message processing module 220 may identify which of the suggested replies are questions, and may use those questions as indication that the message component is deficient. In other words, if the message component has a question as a likely response, then it may contain an inherent ambiguity, missing information, or otherwise represent content that is inconclusive. Based on determining that there are questions as suggested replies to a message component, message processing module 220 may identify the deficient component to the user, or may use the suggested reply to determine how to query the user to cure the deficiency. For example, with the message component of: "when works for you?", if the draft reply message does not address the message component of the received message with any of the draft message components, then the recommendation "let's go in minutes" may be used as a template reply to add into the draft message, or "now" or "tomorrow" may be presented to the user as an option to cure the deficiency during message drafting.

In some examples, message processing module 220 utilizes a named entity resolution module 224 to analyze original content for named entity ambiguities. Named entity resolution module 224 utilizes techniques of named-entity recognition, in combination with named entities data store 234, to identify named entities occurring in a component of text (e.g., annotating text against a knowledge base). Message processing module 220 uses named entity resolution module 224 to identify named entities occurring within message components.

For example, message processing module 220 may transmit a message component, such as "I am going to the airport" to named entity resolution module 224. Named entity resolution module 224 identifies "airport" as a named entity. However, there are many airports that resolve to this named entity and, as such, "airport" is underspecified, and is ambiguous to some degree. Named entity resolution module 224, with permission of the user, may utilize geographic information of the user to narrow the named entity "airport" down to just a few airports near the user. For example, the user may currently be working at their office in Chicago, Ill., which has two major commercial airports: O'Hare International Airport and Midway International Airport. As such, named entity resolution module 224 may return those two airports as potential disambiguation options for the "airport" referenced by the drafting user. If named entity resolution module 224 returns multiple disambiguation options, then message processing module 220 may identify the named entity (e.g., "airport") as an ambiguity in the draft message. Further, message processing module 220 may present the disambiguation options to the drafting user as options to clarify the ambiguity.

Message processing module 220 may be configured to train machine learning models 226 based on historical messages and message threads stored in message data store 230. In some examples, message processing module 220 trains one or more models to use during message analysis. Message processing module 220 may train and utilize a model to classify questions in relation to an expected information type of a response to that question. For example, a question classification model may be configured to classify questions such as "when works for you?", "what time is your flight?", and "what time would you like to meet for lunch?" as an information type of "TIME." In other words, typical responses to such questions may be "in 10 minutes," "6:40 pm," or "in one hour," each of which relates to time. As another example, the question classification model may be configured to classify questions such as "how many tickets would you like?", or "how many people are coming?", or "what is your dress size?" as having the information type "NUMBER." Typical responses to such questions may be "four," "all six of us," or "10," each of which identifies a number. The question classification model may be trained as a neural network with manually labelled messages, or based on message threads in which questions are followed up with answers, such as in pairs of (question, answer).

Further, an entity classification model may be trained to detect and classify entities that appear in replies. For example, the entity classification model may evaluate a reply message component of "four" as being of an information type "NUMBER," or a reply message component of "6:40 pm" as being of an information type "TIME." As such, message processing module 220 may use the entity classification model to determine the information type classification of various reply message components of a draft reply message, and may then use the information type classifications of each reply message component to match up to an associated question of the received message. Accordingly, message processing module 220 may use the question classification model and the entity classification model to detect deficiencies in reply content based on associated received content.

For example, message processing module 220 may parse a received message of "What time is your lunch, and how many people are you expecting?" into two received message components of: "what time is your lunch?", and "how many people are you expecting?" Message processing module 220 may apply each of the received message components to the question classification model to generate associated information types of "TIME," and "NUMBER," respectively. Further, message processing module 220 may receive a draft reply message of "I am expecting 5 people total." Message processing module 220 applies the reply message component of "I am expecting 5 people total" to the entity classification model to determine an information type of "NUMBER." Message processing module 220 then matches up received message components with reply message components to determine whether, for each particular received message component, there is a matching reply message component (e.g., by information type identified by the question classification model and the entity classification model). In this example, the only reply message component "I am expecting 5 people total" is of information type "NUMBER," and is thus matched with the received message component "how many people are you expecting?", also of information type "NUMBER." However, received message component "what time is your lunch?", which is of type "TIME," has no matching reply message component. As such, message processing module 220 identifies the received message component "what time is your lunch?" as a deficient message component.

In another example, message processing module 220 may train and utilize a binary classifier to evaluate original message component for potential discrepancies. Message processing module 220 may train a response prediction model such that, given a particular original message component, the response prediction model is configured to output a probability or score which indicates how likely the original message component is to lead to a follow up question in response. For example, a response prediction model may receive, as input, an original message component "what day of the week is Christmas on this year?" Such a question is unlikely to receive a follow up question as a response, as the likely responses are the seven days of the week. As such, the response prediction model may generate a low score, such as 0.1 (e.g., as a probability between 0.0 and 1.0). For another example, the response prediction model may receive, as input, a message component "I am going out to lunch today." Such a question is more likely to receive a follow up question as a response. For example, likely response may include "ok", "where are you going?", "what time are you going?", "see you when you get back", or "will you be back in time for our meeting?", many of which are follow up questions. As such, the response prediction model may generate a higher score, such as 0.6. Message processing module 220 may train the response prediction model with positive training data extracted from historical message threads based on mining fixed patterns of known clarifying responses (e.g., "could you also provide . . . "), or based on detecting short, directed questions in reply messages. As such, message processing module 220 may use the response prediction model to identify potential deficiencies in original content. For example, message processing module 220 may have a configured ambiguity threshold set at 0.5 and, as such, may identify the original message component "I am going out to lunch today" as deficient because the associated score generated by the response prediction model exceeds the ambiguity threshold.

Figure 3:
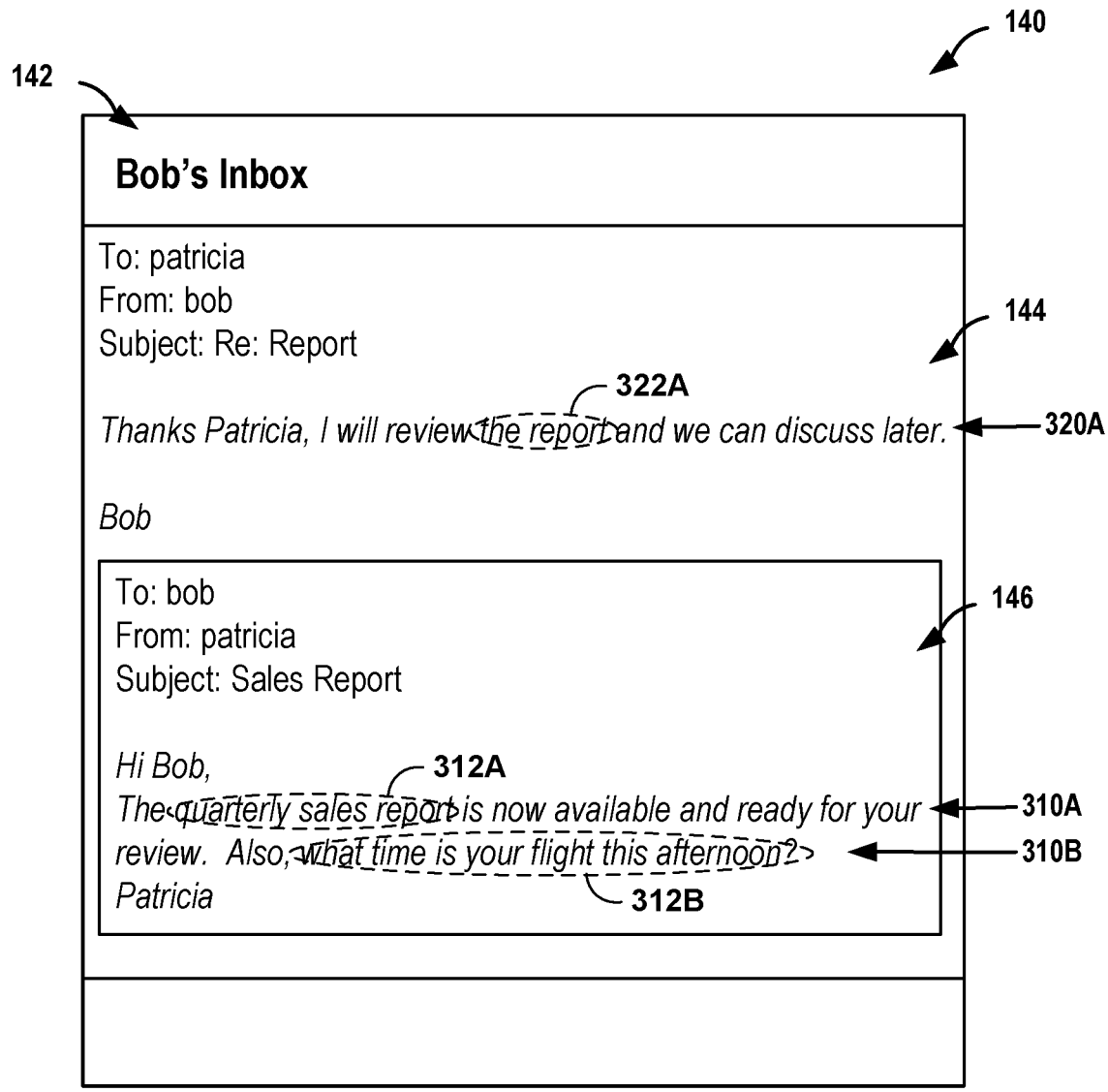
FIG. 3 is a conceptual diagram illustrating an example screen shot of a graphical user interface of a computing device configured to analyze a draft reply message for deficiencies in reply content, in accordance with one or more aspects of the present disclosure.

FIG. 3 is a conceptual diagram illustrating an example screen shot of a graphical user interface of a computing device configured to analyze a draft reply message for deficiencies in reply content, in accordance with one or more aspects of the present disclosure. In this example, a user "Patricia" has sent an initial email to a user "Bob" (the "drafting user" in this example), and user interface 134 represents inbox 142 view of the drafting user's e-mail client (e.g., as provided by UIC 112 of the drafting user's smartphone or other personal computer). The drafting user is composing a reply to message 102 (the "received message"), which is included as received message text 146 below reply message text 144. In this example, the e-mail body of received message text 146 is used as the received message, and the e-mail body of reply message text 144 is used as the draft reply message to that received message. Further, Bob has provided explicit permission for the various components of message processing system 100 to analyze Bob's messages.

In this example, received message text 146 broadly addresses two subjects, generally embodied in two separate sentences. A first sentence 310A references a quarterly sales report and the availability of the report for review. A second sentence 310B is a question inquiring about when Bob is planning to leave for the airport. In the draft reply, the drafting user includes a thank you to Patricia, and a first reply sentence 320A that acknowledges the report and commits to review and discussion at a later time. However, in the draft reply, the drafting user did not address the question included in the received message. In other words, Bob did not mention what time he was planning to leave for the airport.

The drafting user, at this stage of composing the draft reply message, attempts to send the draft reply message (e.g., by pressing a "send" button (not shown)). In response, because Bob has provided explicit permission for message processing system to access his message, message processing module 120 initiates analysis of the draft reply message (e.g., perhaps activated by messaging client 116 on computing device 110A of the drafting user).

In this example, message processing module 120 performs responsive content analysis on received message text 146 and reply message text 144. Message processing module 120 may perform natural language processing on sentences 310A, 310B to identify a first received message component 312A, the quarterly sales report, and a second received message component 312B, the question regarding a flight and, more specifically, a departure time of that flight. Message processing module 120 also performs natural language processing on sentence 320A to identify what subjects are addressed by the draft reply message. Here, sentence 320A references the report at reply component 322A. As such, message processing module 120 does not identify sentence 310A as a deficiency in the draft reply message. However, there are no sentences in the draft reply message that answer the question of sentence 310B. As such, message processing module 120 identifies sentence 310B as a deficiency in the draft reply message.

In some examples, message processing module 120 may utilize the question classification model and the entity classification model to determine deficient components of the draft reply in comparison to the received message. For example, message processing module 120 may apply the second received message component 312B "what time is your flight this afternoon?" to the question classification model, which may return an information type of "TIME." Message processing module 120 may also apply the draft message components "I will review the report" and "we can discuss later" to the entity classification model, but neither return an information type of "TIME." As such, the second received message component 312B appears to be unaddressed, and thus message processing module 120 identifies second received message component 312B as being deficient (e.g., highlighting the associated text within received message text 146). Further, in some examples, message processing module 120 may use the information type of "TIME," as identified by the question classification model, to identify an appropriate template to insert into the draft message. For example, message processing module 120 may insert the text "What time is your flight this afternoon?" In some examples, message processing module 120 may use the information type to limit reply options. For example, suggestion module 222 may provide two suggested replies for the question "what time is your flight this afternoon?": "5 pm" and "I cancelled my flight." Message processing module 120 may apply each of the suggested replies to the entity classification module 224, which identifies only the "5 pm" reply as information type of "TIME." As such, message processing module 120 may select the "5 pm" reply as an option to cure the deficiency. Message processing module 120 may also generate a reply option based on the question and the suggested reply, such as "the time of my flight this afternoon is 5 pm."

In some examples, message processing module 120 may utilize the comparison model to determine deficient components of the draft reply in comparison to the received message. For example, message processing module 120 may parse received message text 146 into sentences 310A, 310B (e.g., as received components), and reply message text 144 into sentence 320A (e.g., as draft components). Message processing module 120 examines reply message text 144 to determine whether any of the draft components address each of the received components found in received message text 146. More specifically, for each received component, message processing module 120 uses the comparison model to generate a comparison score between that received component and each draft component, where the received component and one draft component act as inputs to the model. The comparison score generated by the comparison model represents a likelihood as to whether the draft component addresses the received component. For example, when sentence 310A and sentence 320A are submitted as inputs to the comparison model, the resultant comparison score may be a relatively high number (e.g., due to the fact that a subject of the draft message, the report, is a subject similar to a subject of the received message, the quarterly sales report). However, when sentence 310B and sentence 320A are submitted to the comparison model, the comparison model may generate a relatively low score (e.g., due to the fact that sentence 320A makes no reference to, provides an answer to, the question provided in sentence 310B). As such, message processing module 120 may identify sentence 310B as deficient in the draft reply message if all of the comparison scores for that sentence 310B do not satisfy (e.g., are each below) a threshold.

After analysis and detection of deficiencies in the draft reply message, message processing module 120 may provide indication of each identified deficiency. Some examples may include highlighting or otherwise identifying received content components not addressed in the draft reply message. For example, message processing module 120 may cause sentence 310B in received message text 146 to be highlighted. Some examples may include automatically amending reply message text 144 by adding a template reply that can be edited by the drafting user, or by prompting the user with multiple likely replies. As such, the drafting user may review the identified deficiencies and may choose to either correct those deficiencies or continue sending the draft reply message unaltered.

Figures 4A, 4B:
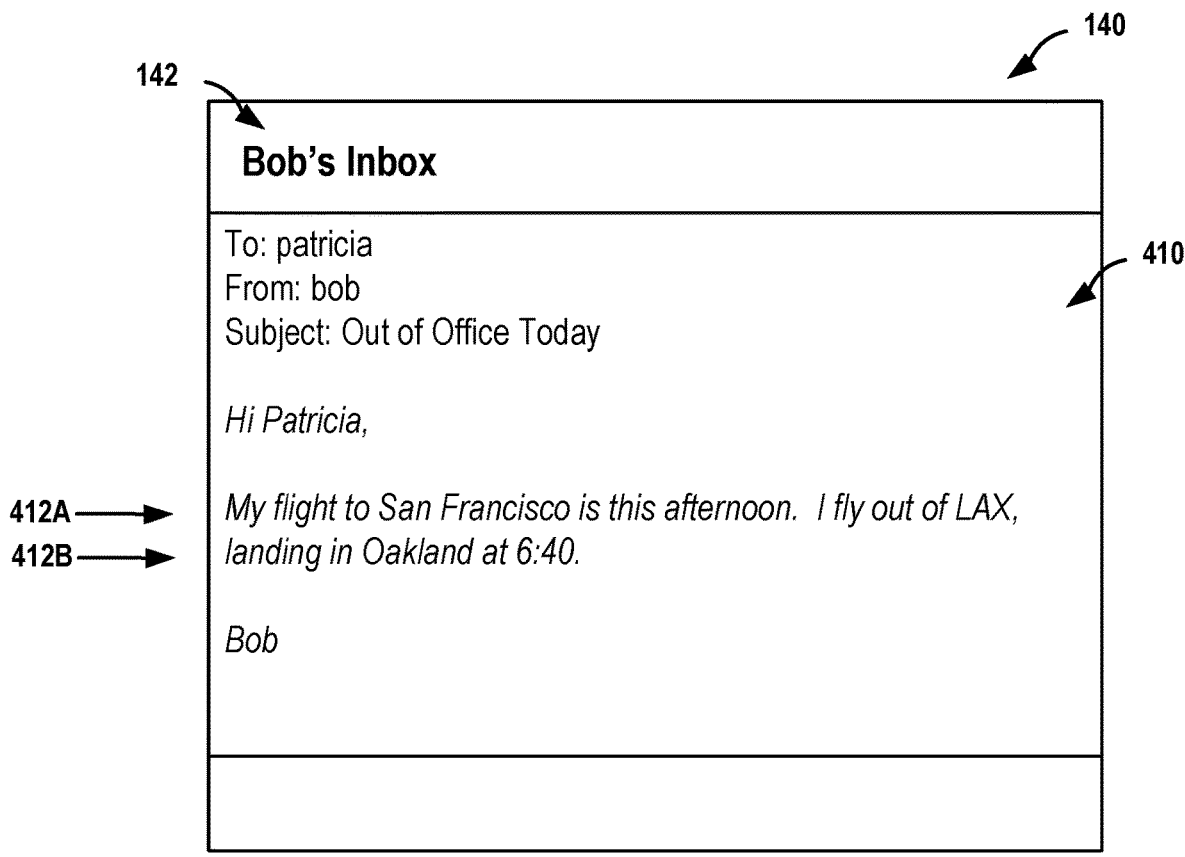
FIG. 4A is a conceptual diagram illustrating an example screen shot of a graphical user interface of a computing device configured to analyze a draft message for deficiencies in original content, in accordance with one or more aspects of the present disclosure.
FIG. 4B is a conceptual diagram illustrating various components of the content of the screen shot of FIG. 4A as identified by message processing module, in accordance with one or more aspects of the present disclosure.

FIG. 4A is a conceptual diagram illustrating an example screen shot of a graphical user interface of a computing device configured to analyze a draft message for deficiencies in original content, in accordance with one or more aspects of the present disclosure. In this example, the drafting user is composing an original e-mail to Patricia to inform her that he will be out of the office. Draft message text 410 includes a first sentence 412A indicating that Bob has a flight this afternoon to San Francisco, and a second sentence 412B indicating that he is flying out of Los Angeles International Airport (LAX) and is landing in Oakland at 6:40.

FIG. 4B is a conceptual diagram illustrating various components of the content of the screen shot of FIG. 4A as identified by message processing module 120, in accordance with one or more aspects of the present disclosure. In this example, first sentence 412A includes a subject 420, "my flight," that identifies a seed subject within the original content. Sentences 412A, 412B also include several components that each relate to aspects of the seed subject. A first informational component 422A identifies "San Francisco" as a destination city associated with the flight. A second informational component 422B identifies "this afternoon" as a rough departure time. A third informational component 422C identifies "fly out of LAX" as a departure airport. A fourth informational component 422D identifies "landing in Oakland" as a destination airport. A fifth informational component 422E identifies "6:40" as a destination arrival time.

Referring now to FIGS. 4A and 4B, the drafting user, at this stage of composing the draft message, attempts to send the draft message (e.g., by pressing a "send" button). In response to the drafting user attempting to send the message and after the drafting user has provided explicit permission for message processing system 100 to access the draft user's messages, message processing module 120 initiates analysis of the draft message (e.g., perhaps activated by messaging client 116 on computing device 110A of the drafting user).

In providing explicit permission for message processing system 100 to analyze or otherwise access the drafting user's message, the drafting user may be provided with controls enabling the user to make an election as to both if and when message processing system 100 (and any components thereof) may enable collection of user information (e.g., information about the drafting user's social network, social actions or activities, profession, the drafting user's preferences, or the drafting user's current location), and if the drafting user is sent content or communications from a server. In addition, certain data may be treated in one or more ways before it is stored or used, so that personally identifiable information is removed. For example, the drafting user's identity may be treated so that no personally identifiable information can be determined for the drafting user, or the drafting user's geographic location may be generalized where location information is obtained (such as to a city, ZIP code, or state level), so that a particular location of the drafting user cannot be determined. Thus, the drafting user may have control over what information is collected about the drafting user, how that information is used, and what information is provided to the drafting user.

Message processing module 120 analyzes this draft message for deficiencies in original content. In this example, a departure flight time is ambiguous or otherwise unspecific, as the only indication is "this afternoon." As such, message processing module 120 may detect and help rectify this deficiency. In one example, message processing module 120 may identify seed subjects using the informational component model. Message processing module 120 may submit, as input, each individual sentence 412. As an output, the informational component model identifies any seed subjects included in the input component, as well as any informational components associated with the included seed subjects. In some examples, the informational component model may accept one or more seed subjects as inputs to the model and may use those input seed subjects as seed subjects when identifying informational components within the input sentence. For example, based on first sentence 412A, informational component model may identify a flight as a seed subject (e.g., based on the text "my flight"). The model, having been trained on historical messages that included flights and various flight information examples, can both identify a flight as a seed subject, and also can identify the various types of informational components often associated with flights. When interpreting the rest of first sentence 412A, the model identifies first informational component 422A as a "departure airport" and "this afternoon" as an approximate departure time. Similarly, when analyzing second sentence 412B, the model identifies a flight as a seed subject, and further identifies informational components 422C, 422D, and 422E as informational components associated with flights.

In some examples, message processing module 120 may utilize suggestion module 164 to analyze original content for deficiencies. Message processing module 120 may parse the reply message text 144 into multiple content components, such as sentences 412. For each content component, message processing module 120 submits that content component to suggestion module 164 and receives one or more suggested replies. If any of those suggested replies are in the form of a question, then that content component may be treated as a deficient component. Further, the suggested reply question may be used as a prospective cure for that particular deficiency. For example, sentence 412A may yield a suggested reply of "what time?", or "what time this afternoon?".

After analysis and detection of deficiencies in the draft message, message processing module 120 may provide indication of each identified deficiency. Some examples may include identifying informational components that were identified as deficient (e.g., missing, incomplete) in the draft message. For example, message processing module 120 may provide an indication of which informational component was missing, or may add a template sentence that can be edited by the drafting user to rectify the missing informational component (e.g., "My flight departs at _____"). Some examples may include providing suggested replies as prospective additions or edits to the draft reply message in order to cure the deficiency (e.g., as a drop-down list). As such, the drafting user may review the identified deficiencies and may choose to either correct those deficiencies or continue sending the draft reply unaltered.

Figure 5:
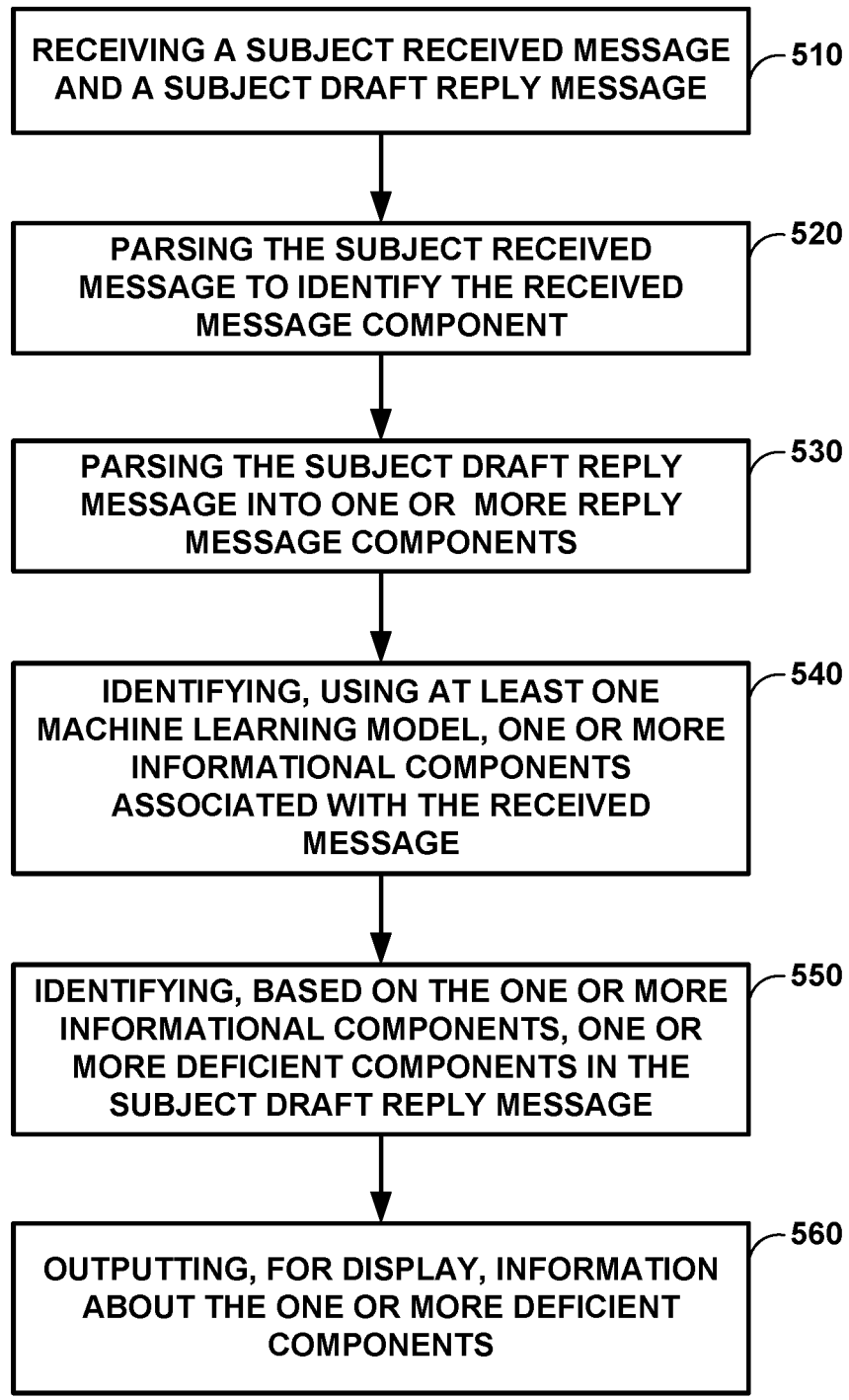
FIG. 5 is a flowchart illustrating example operations for analyzing draft messages for deficient content, in accordance with one or more aspects of the present disclosure.

FIG. 5 is a flowchart illustrating example operations for analyzing draft messages for deficient content, in accordance with one or more aspects of the present disclosure. FIG. 5 is described below in the context of primary computing device 110A or message system 160 executing message processing module 120 of FIG. 1. For example, message processing module 120, while executing at one or more processors of message system 160, may perform operations 310-350, in accordance with one or more aspects of the present disclosure. In some examples, message processing module 120 may be executing on computing device 110A.

In operation, message processing module 120 receives a subject received message and a subject draft reply message to the subject received message, the subject received message including a received message component, the received message component representing one or more of a question, a request, and a subject presented in the subject received message (510). Message processing module 120 parses the subject received message to identify the received message component (520). Message processing module 120 also parses the subject draft reply message into one or more reply message components (530).

Message processing module 120 also identifies one or more informational components associated with the received message component and the one or more reply message components by at least applying one or more machine learning models to the received message component and each reply message component of the one or more reply message components (540). Message processing module 120 further identifies, based on the one or more informational components, one or more deficient components in the subject draft reply message (550). Message processing module 120 also outputs, for display, information about the one or more deficient components (560).

In some examples, identifying one or more informational components further includes determining, by the at least one processor and using a first machine learning model of the one or more machine learning models, a first information type associated with the received message component, the first information type indicating a type of information expected in a response to the received message component, and determining, by the at least one processor and using a second machine learning model of the one or more machine learning models, a second information type associated with a first draft message component, the second information type indicating a type of information associated with the first draft message component, and wherein identifying one or more deficient components further includes determining that the first information type does not match the second information type, and identifying, based on determining that the first information type does not match the second information type, that the received message component is a deficient component of the one or more deficient components.

In some examples, message processing module 120 also trains a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

In some examples, message processing module 120 also trains a first machine learning model of the one or more machine learning models with a corpus of received messages and associated reply messages, the reply messages identifying one or more missing components from the associated received message not addressed in the reply message, missing components representing one or more of questions, requests, and subjects presented in a received message not addressed in the associated reply message, the machine learning model being configured to identify missing components in an input draft reply message based on an input received message and the input draft reply message, wherein identifying one or more informational components further comprises applying the first machine learning model to a first seed subject for each draft reply component of the one or more draft reply components to generate a draft reply component score for each draft reply component, and wherein identifying one or more deficient components includes determining, for each seed subject, whether any of the draft reply component scores associated with the seed subject satisfies a threshold, and for each seed subject and responsive to determining that all of the draft reply component scores associated with the corresponding seed subject do not satisfy the threshold, identifying the corresponding seed subject as being one of the one or more deficient components.

In some examples, message processing module 120 also identifies a suggested reply associated with a first deficient component from the one or more deficient components, inserts the suggested reply into the subject draft reply message, and outputs, for display, the updated subject draft reply message including the suggested reply. In some examples, outputting information about the one or more deficient components comprises highlighting a first seed item associated with a first deficient component of the one or more deficient components within the subject received message. In some examples, outputting information about the one or more deficient components comprises prompting the user to provide additional information associated with the one or more deficient components.

Clause 1. A method comprising: receiving, by at least one processor, a subject received message and a subject draft reply message to the subject received message, the subject received message including a received message component, the received message component representing one or more of a question, a request, and a subject included in content of the subject received message; parsing, by the at least one processor, the content of the subject received message to identify the received message component; parsing, by the at least one processor, the subject draft reply message into one or more reply message components; identifying, by the at least one processor, one or more informational components associated with the received message component and the one or more reply message components by at least applying one or more machine learning models to the received message component and each reply message component of the one or more reply message components; identifying, by the at least one processor and based on the one or more informational components, one or more deficient components in the subject draft reply message; and outputting, for display, information about the one or more deficient components.

Clause 2. The method of clause 1, wherein identifying one or more informational components further comprises: determining, by the at least one processor and using a first machine learning model of the one or more machine learning models, a first information type associated with the received message component, the first information type indicating a type of information expected in a response to the received message component; and determining, by the at least one processor and using a second machine learning model of the one or more machine learning models, a second information type associated with a first draft message component, the second information type indicating a type of information associated with the first draft message component, and wherein identifying one or more deficient components further comprises: determining that the first information type does not match the second information type; and identifying, based on determining that the first information type does not match the second information type, that the received message component is a deficient component of the one or more deficient components.

Clause 3. The method of clause 1 or clause 2, further comprising: training, by the at least one processor, a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

Clause 4. The method of any one of clauses 1-3, further comprising: training, by at least one processor, a first machine learning model of the one or more machine learning models with a corpus of received messages and associated reply messages, the reply messages identifying one or more missing components from the associated received message not addressed in the reply message, missing components representing one or more of questions, requests, and subjects presented in a received message not addressed in the associated reply message, the machine learning model being configured to identify missing components in an input draft reply message based on an input received message and the input draft reply message; wherein identifying one or more informational components further comprises applying the first machine learning model to a first seed subject for each draft reply component of the one or more draft reply components to generate a draft reply component score for each draft reply component, and wherein identifying one or more deficient components comprises: determining, for each seed subject, whether any of the draft reply component scores associated with the seed subject satisfies a threshold; and for each seed subject and responsive to determining that all of the draft reply component scores associated with the corresponding seed subject do not satisfy the threshold, identifying the corresponding seed subject as being one of the one or more deficient components.

Clause 5. The method of any one of clauses 1-4, further comprising: identifying a suggested reply associated with a first deficient component from the one or more deficient components; inserting, by the at least one processor, the suggested reply into the subject draft reply message; and outputting, for display, the updated subject draft reply message including the suggested reply.

Clause 6. The method of any one of clauses 1-5, wherein outputting information about the one or more deficient components comprises highlighting a first seed item associated with a first deficient component of the one or more deficient components within the subject received message.

Clause 7. The method of any one of clauses 1-6, wherein outputting information about the one or more deficient components comprises prompting the user to provide additional information associated with the one or more deficient components.

Clause 8. A computing system comprising: a storage device that stores one or more modules; and at least one processor that executes the one or more modules to: receive a subject received message and a subject draft reply message to the subject received message, the subject received message including a received message component, the received message component representing one or more of a question, a request, and a subject presented in the subject received message; parse the subject received message to identify the received message component; parse the subject draft reply message into one or more reply message components; identifying one or more informational components associated with the received message component and the one or more reply message components by at least applying one or more machine learning models to the received message component and each reply message component of the one or more reply message components; identify, based on the one or more informational components, one or more deficient components in the subject draft reply message; and output, for display, information about the one or more deficient components.

Clause 9. The system of clause 8, wherein identifying one or more informational components further comprises: determining, by the at least one processor and using the one or more machine learning models, a first information type associated with the received message component, the first information type indicating a type of information expected in a response to the received message component; and determining, by the at least one processor and using a second machine learning model of the at least one machine learning models, a second information type associated with a first draft message component, the second information type indicating a type of information associated with the first draft message component, wherein identifying one or more deficient components further comprises: determining that the first information type does not match the second information type; and identifying, based on determining that the first information type does not match the second information type, that the received message component is a deficient component of the one or more deficient components.

Clause 10. The system of clause 8 or clause 9, the at least one processor is further configured to: train a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

Clause 11. The system of any one of clauses 8-10, the at least one processor is further configured to: train a first machine learning model of the one or more machine learning models with a corpus of received messages and associated reply messages, the reply messages identifying one or more missing components from the associated received message not addressed in the reply message, missing components representing one or more of questions, requests, and subjects presented in a received message not addressed in the associated reply message, the machine learning model being configured to identify missing components in an input draft reply message based on an input received message and the input draft reply message; wherein identifying one or more informational components further comprises applying the first machine learning model to a first seed subject for each draft reply component of the one or more draft reply components to generate a draft reply component score for each draft reply component, and wherein identifying one or more deficient components comprises: determining, for each seed subject, whether any of the draft reply component scores associated with the seed subject satisfies a threshold; and for each seed subject and responsive to determining that all of the draft reply component scores associated with the corresponding seed subject do not satisfy the threshold, identifying the corresponding seed subject as being one of the one or more deficient components.

Clause 12. The system of any one of clauses 8-11, the at least one processor is further configured to: identify a suggested reply associated with a first deficient component, the suggested reply being identified to address the first deficient component; insert the suggested reply into the subject draft reply message; and output, for display, the updated subject draft reply message including the suggested reply.

Clause 13. The system of any one of clauses 8-12, wherein outputting information about the one or more deficient components comprises highlighting a first seed item associated with a first deficient component of the one or more deficient components within the subject received message.

Clause 14. The system of any one of clauses 8-13, wherein outputting information about the one or more deficient components comprises prompting the user to provide additional information associated with the one or more deficient components.

Clause 15. A computer-readable storage medium having stored thereon instructions that, when executed, cause a processor of a computing system to: receive a subject received message and a subject draft reply message to the subject received message, the subject received message including a received message component, the received message component representing one or more of a question, a request, and a subject presented in the subject received message; parse the subject received message to identify the received message component; parse the subject draft reply message into one or more reply message components; identify one or more informational components associated with the received message component and the one or more reply message components by at least applying one or more machine learning models to the received message component and each reply message component of the one or more reply message components; identify, based on the one or more informational components, one or more deficient components in the subject draft reply message; and output, for display, information about the one or more deficient components.

Clause 16. The computer-readable storage medium of clause 15, wherein identifying one or more informational components further comprises: determining, by the at least one processor and using the one or more machine learning models, a first information type associated with the received message component, the first information type indicating a type of information expected in a response to the received message component; and determining, by the at least one processor and using a second machine learning model of the at least one machine learning models, a second information type associated with a first draft message component, the second information type indicating a type of information associated with the first draft message component, wherein identifying one or more deficient components further comprises: determining that the first information type does not match the second information type; and identifying, based on determining that the first information type does not match the second information type, that the received message component is a deficient component of the one or more deficient components.

Clause 17. The computer-readable storage medium of clause 15 or clause 16, the instructions further cause the processor to: train a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

Clause 18. The computer-readable storage medium of any one of clauses 15-17, the instructions further cause the processor to: identify a suggested reply associated with a first deficient component from the one or more deficient components; insert the suggested reply into the subject draft reply message; and output, for display, the updated subject draft reply message including the suggested reply.

Clause 19. The computer-readable storage medium of any one of clauses 15-18, wherein outputting information about the one or more deficient components comprises highlighting a first seed item associated with a first deficient component of the one or more deficient components within the subject received message.

Clause 20. The computer-readable storage medium of any one of clauses 15-19, wherein outputting information about the one or more deficient components comprises prompting the user to provide additional information associated with the one or more deficient components.

Clause 21. A computer-readable storage medium comprising means for performing any combination of the methods of clauses 1-7.

Clause 22. A device comprising means for performing any combination of the methods of clauses 1-7.

Clause 23. A method comprising: receiving, by at least one processor, a subject draft message; parsing, by the at least one processor, the content of the subject draft message to identify one or more message components; identifying, by the at least one processor, one or more informational components associated with the one or more message components by at least applying one or more machine learning models to the one or more message components; identifying, by the at least one processor and based on the one or more informational components, one or more deficient components in the subject draft message; and outputting, for display, information about the one or more deficient components.

Clause 24. The method of clause 23, wherein the one or more deficient components comprise at least one of the one or more message components having incomplete or ambiguous information.

Clause 25. The method of any of clauses 23 or 24, further comprising: determining, by the at least one processor and based on the one or more deficient components, one or more candidate phrases, wherein outputting the information about the one or more deficient components comprises outputting the one or more candidate phrases.

Clause 26. The method of clause 25, wherein determining the one or more candidate phrases comprises: determining, based on the plurality of question answer pairs from a plurality of prior messages and the one or more deficient components, one or more responses predicted to be received after sending the subject draft message and a respective probability for each of the one or more responses predicted to be received, wherein the respective probability indicates a likelihood that the associated responses is predicted to be received; and identifying, by the at least one processor and based on the respective probabilities, at least one of the one or more responses predicted to be received as the one or more candidate phrases.

Clause 27. The method of any of clauses 23-26, wherein identifying one or more informational components further comprises: determining, by the at least one processor and using a first machine learning model of the one or more machine learning models, a first information type associated with the one or more message components, the first information type indicating a type of information expected in a response to the subject draft message component; and determining, by the at least one processor and using a second machine learning model of the one or more machine learning models, a second information type associated with the one or more message components, the second information type indicating a type of information associated with the one or more draft message components, and wherein identifying one or more deficient components further comprises: determining that the first information type does not match the second information type; and identifying, based on determining that the first information type does not match the second information type, that the received message component is a deficient component of the one or more deficient components.

Clause 28. The method of any of clauses 23-27, further comprising: training, by the at least one processor, a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

Clause 29. The method of any of clauses 23-28, further comprising: training, by at least one processor, a first machine learning model of the one or more machine learning models with a corpus of received messages and associated reply messages, the reply messages identifying one or more missing components from the associated received message not addressed in the reply message, missing components representing one or more of questions, requests, and subjects presented in a received message not addressed in the associated reply message, the machine learning model being configured to identify missing components in an input draft message based on the input draft message, wherein identifying one or more informational components further comprises applying the first machine learning model to a first seed subject for each message component of the one or more message components to generate a draft message component score for each draft message component, and wherein identifying one or more deficient components comprises: determining, for each seed subject, whether any of the draft message component scores associated with the seed subject satisfies a threshold; and, for each seed subject and responsive to determining that all of the draft message component scores associated with the corresponding seed subject do not satisfy the threshold, identifying the corresponding seed subject as being one of the one or more deficient components.

Clause 30. The method of any of clauses 23-29, further comprising: identifying a suggested reply associated with a first deficient component from the one or more deficient components; inserting, by the at least one processor, the suggested reply into the subject draft message; and outputting, for display, the updated subject draft message including the suggested reply.

Clause 31. The method of any of clauses 23-30, wherein outputting information about the one or more deficient components comprises highlighting a first seed item associated with a first deficient component of the one or more deficient components within the subject draft message.

Clause 32. The method of any of clauses 23-31, wherein outputting information about the one or more deficient components comprises prompting the user to provide additional information associated with the one or more deficient components.

Clause 33. A non-transitory computer-readable medium that stores instructions that, when executed by one or more processors of a computing device, cause the one or more processors to performing any combination of the methods of clauses 23-32.

Clause 34. A device comprising means for performing any combination of the methods of clauses 23-32.

Clause 35. A computing system comprising: a storage device that stores one or more modules; and at least one processor that executes the one or more modules to: received a subject draft message; parse the content of the subject draft message to identify one or more message components; identify one or more informational components associated with the one or more message components by at least applying one or more machine learning models to the one or more message components; identify, based on the one or more informational components, one or more deficient components in the subject draft message; and output, for display, information about the one or more deficient components.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    receiving, by at least one processor, a subject received message including a received message component, the received message component representing one or more of a question, a request, and a subject included in content of the subject received message;
    receiving, by the at least one processor, an indication of user input composing a subject draft reply message to the subject received message;
    parsing, by the at least one processor, the content of the subject received message to identify the received message component;
    parsing, by the at least one processor, the subject draft reply message into one or more reply message components;
    identifying, by the at least one processor, one or more informational components associated with the received message component and the one or more reply message components by at least applying one or more machine learning models to the received message component and each reply message component of the one or more reply message components;
    identifying, by the at least one processor, one or more deficient components from the one or more informational components in the subject draft reply message, wherein each of the one or more deficient components is a respective one of the one or more informational components that is missing or incomplete in the draft reply message; and
    outputting, for display, information about the one or more deficient components.

2. The method of claim 1, wherein identifying one or more informational components further comprises:
    determining, by the at least one processor and using a first machine learning model of the one or more machine learning models, a first information type associated with the received message component, the first information type indicating a type of information expected in a response to the received message component; and
    determining, by the at least one processor and using a second machine learning model of the one or more machine learning models, a second information type associated with a first draft message component, the second information type indicating a type of information associated with the first draft message component, and
    wherein identifying one or more deficient components further comprises:
        determining that the first information type does not match the second information type; and
        identifying, based on determining that the first information type does not match the second information type, that the received message component is a deficient component of the one or more deficient components.

3. The method of claim 1, further comprising:
    training, by the at least one processor, a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

4. The method of claim 1, further comprising:
    training, by at least one processor, a first machine learning model of the one or more machine learning models with a corpus of received messages and associated reply messages, the reply messages identifying one or more missing components from the associated received message not addressed in the reply message, missing components representing one or more of questions, requests, and subjects presented in a received message not addressed in the associated reply message, the first machine learning model being configured to identify missing components in an input draft reply message based on an input received message and the input draft reply message;
    wherein identifying one or more informational components further comprises applying the first machine learning model to a first seed subject for each draft reply component of the one or more draft reply components to generate a draft reply component score for each draft reply component, and
    wherein identifying one or more deficient components comprises:
        determining, for each seed subject, whether any of the draft reply component scores associated with the seed subject satisfies a threshold; and
        for each seed subject and responsive to determining that all of the draft reply component scores associated with the corresponding seed subject do not satisfy the threshold, identifying the corresponding seed subject as being one of the one or more deficient components.

5. The method of claim 1, further comprising:
identifying a suggested reply associated with a first deficient component from the one or more deficient components;
inserting, by the at least one processor, the suggested reply into the subject draft reply message; and
outputting, for display, the updated subject draft reply message including the suggested reply.

6. The method of claim 1, wherein outputting information about the one or more deficient components comprises highlighting a first seed item associated with a first deficient component of the one or more deficient components within the subject received message.

7. The method of claim 1, wherein outputting information about the one or more deficient components comprises prompting a user to provide additional information associated with the one or more deficient components.

8. A computing system comprising:
a storage device that stores one or more modules; and
at least one processor that executes the one or more modules to:
receive a subject received message including a received message component, the received message component representing one or more of a question, a request, and a subject presented in the subject received message;
receive an indication of user input composing a subject draft reply message to the subject received message;
parse the subject received message to identify the received message component;
parse the subject draft reply message into one or more reply message components;
identifying one or more informational components associated with the received message component and the one or more reply message components by at least applying one or more machine learning models to the received message component and each reply message component of the one or more reply message components;
identify one or more deficient components from the one or more informational components in the subject draft reply message, wherein each of the one or more deficient components is a respective one of the one or more informational components that is missing or incomplete in the draft reply message; and
output, for display, information about the one or more deficient components.

9. The system of claim 8, wherein identifying one or more informational components further comprises:
determining, by the at least one processor and using the one or more machine learning models, a first information type associated with the received message component, the first information type indicating a type of information expected in a response to the received message component; and
determining, by the at least one processor and using a second machine learning model of the one or more machine learning models, a second information type associated with a first draft message component, the second information type indicating a type of information associated with the first draft message component, wherein identifying one or more deficient components further comprises:

determining that the first information type does not match the second information type; and
identifying, based on determining that the first information type does not match the second information type, that the received message component is a deficient component of the one or more deficient components.

10. The system of claim 8, the at least one processor is further configured to: train a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

11. The system of claim 8, the at least one processor is further configured to: train a first machine learning model of the one or more machine learning models with a corpus of received messages and associated reply messages, the reply messages identifying one or more missing components from the associated received message not addressed in the reply message, missing components representing one or more of questions, requests, and subjects presented in a received message not addressed in the associated reply message, the first machine learning model being configured to identify missing components in an input draft reply message based on an input received message and the input draft reply message;
wherein identifying one or more informational components further comprises applying the first machine learning model to a first seed subject for each draft reply component of the one or more draft reply components to generate a draft reply component score for each draft reply component, and
wherein identifying one or more deficient components comprises:
determining, for each seed subject, whether any of the draft reply component scores associated with the seed subject satisfies a threshold; and
for each seed subject and responsive to determining that all of the draft reply component scores associated with the corresponding seed subject do not satisfy the threshold, identifying the corresponding seed subject as being one of the one or more deficient components.

12. The system of claim 8, the at least one processor is further configured to:
identify a suggested reply associated with a first deficient component, the suggested reply being identified to address the first deficient component;
insert the suggested reply into the subject draft reply message; and
output, for display, the updated subject draft reply message including the suggested reply.

13. The system of claim 8, wherein outputting information about the one or more deficient components comprises highlighting a first seed item associated with a first deficient component of the one or more deficient components within the subject received message.

14. The system of claim 8, wherein outputting information about the one or more deficient components comprises prompting a user to provide additional information associated with the one or more deficient components.

15. A non-transitory computer-readable storage medium having stored thereon instructions that, when executed, cause a processor of a computing system to:

receive a subject received message including a received message component, the received message component representing one or more of a question, a request, and a subject presented in the subject received message;

receive an indication of user input composing a subject draft reply message to the subject received message;

parse the subject received message to identify the received message component;

parse the subject draft reply message into one or more reply message components;

identify one or more informational components associated with the received message component and the one or more reply message components by at least applying one or more machine learning models to the received message component and each reply message component of the one or more reply message components;

identify one or more deficient components from the one or more informational components in the subject draft reply message, wherein each of the one or more deficient components is a respective one of the one or more informational components that is missing or incomplete in the draft reply message; and output, for display, information about the one or more deficient components.

16. The non-transitory computer-readable storage medium of claim 15, wherein the instructions further cause the processor to:

determine, using the one or more machine learning models, a first information type associated with the received message component, the first information type indicating a type of information expected in a response to the received message component; and determine, using a second machine learning model of the one or more machine learning models, a second information type associated with a first draft message component, the second information type indicating a type of information associated with the first draft message component, wherein the instructions that cause the processor to identify identifying one or more deficient components further include instructions that cause the processor to:

determine that the first information type does not match the second information type; and identify, based on determining that the first information type does not match the second information type, that the received message component is a deficient component of the one or more deficient components.

17. The non-transitory computer-readable storage medium of claim 15, the instructions further cause the processor to:

train a first machine learning model of the one or more machine learning models with a plurality of response tuples, each response tuple of the plurality of response tuples includes a question and an associated answer, the first machine learning model being configured to identify an information type associated with an input question, the information type indicating a type of information expected in a response to the input question.

18. The non-transitory computer-readable storage medium of claim 15, the instructions further cause the processor to:

identify a suggested reply associated with a first deficient component from the one or more deficient components;

insert the suggested reply into the subject draft reply message; and output, for display, the updated subject draft reply message including the suggested reply.

19. The non-transitory computer-readable storage medium of claim 15, wherein outputting information about the one or more deficient components comprises highlighting a first seed item associated with a first deficient component of the one or more deficient components within the subject received message.

20. The non-transitory computer-readable storage medium of claim 15 wherein outputting information about the one or more deficient components comprises prompting a user to provide additional information associated with the one or more deficient components.

* * * * *